United States Patent [19]
Narayan et al.

[11] Patent Number: 5,940,602
[45] Date of Patent: *Aug. 17, 1999

[54] METHOD AND APPARATUS FOR PREDECODING VARIABLE BYTE LENGTH INSTRUCTIONS FOR SCANNING OF A NUMBER OF RISC OPERATIONS

[75] Inventors: Rammohan Narayan; Thang M. Tran, both of Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,114

[22] Filed: Jun. 11, 1997

[51] Int. Cl.⁶ ........................................................ G06F 9/38
[52] U.S. Cl. ............................................ 395/389; 395/391
[58] Field of Search ...................................... 395/380, 384, 395/385, 386, 389, 390, 800.23, 391

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 651322 | 5/1995 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 1994 Pentium Processor Family User's Manual, vol. 1: Pentium Processor Family Data Book, pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.
Minigawa, et al., "Pre–Decoding Mechanism For Superscalar Architecture," Proceedings *IEEE Pacific Rim Conference on Communications, Computers and Signal Processing*, May 9–10, 1991, pp. 21–24.
Tomasulo, "An Efficient Algorithm for Exploiting Multiple Arithmetic Units," IBM Journal, Jan. 1967, pp. 25–33.
U.S. Patent Application No. 08/873,344, filed Jun. 11, 1997.

*Primary Examiner*—Krisna Lim
*Assistant Examiner*—Viet Vu
*Attorney, Agent, or Firm*—Conley, Rose & Tayon, PC; B. Noel Kivlin; Lawrence J. Merkel

[57] ABSTRACT

A superscalar microprocessor is provided that includes a predecode unit configured to predecode variable byte-length instructions prior to their storage within an instruction cache. The predecode unit is configured to generate a plurality of predecode bits for each instruction byte. The plurality of predecode bits associated with each instruction byte include an end bit and an ROP bit that indicates a number of microinstructions required to implement the instruction. The plurality of predecode bits are collectively referred to as a predecode tag. An instruction alignment unit then uses the predecode tags to identify microinstructions. The instruction alignment unit dispatches the microinstructions simultaneously to a plurality of decode units which form fixed issue positions within the superscalar microprocessor. Because the instruction alignment unit identifies microinstructions, the multiplexing of instructions from the instruction alignment unit to the decoders is simplified. Accordingly, relatively fast multiplexing may be attained, and high performance may be accommodated.

18 Claims, 9 Drawing Sheets

U.S. PATENT DOCUMENTS

| | | | |
|---|---|---|---|
| 5,101,341 | 3/1992 | Circello et al. | 395/389 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,233,696 | 8/1993 | Suzuki | 395/380 |
| 5,337,415 | 8/1994 | DeLano et al. | 395/389 |
| 5,438,668 | 8/1995 | Coon et al. | 395/380 |
| 5,459,844 | 10/1995 | Eickemeyer et al. | 395/389 |
| 5,499,204 | 3/1996 | Barrera et al. | 365/49 |
| 5,513,330 | 4/1996 | Stiles | 395/380 |
| 5,537,629 | 7/1996 | Brown et al. | 395/386 |
| 5,560,028 | 9/1996 | Sachs et al. | 395/800.23 |
| 5,566,298 | 10/1996 | Boggs et al. | 395/182.08 |
| 5,586,276 | 12/1996 | Grochowski et al. | 395/380 |
| 5,586,277 | 12/1996 | Brown et al. | 395/386 |
| 5,598,544 | 1/1997 | Ohshima | 395/380 |
| 5,600,806 | 2/1997 | Brown et al. | 395/380 |
| 5,630,082 | 5/1997 | Yao et al. | 395/389 |
| 5,644,744 | 7/1997 | Mahin et al. | 395/383 |
| 5,651,125 | 7/1997 | Witt et al. | 395/394 |
| 5,689,672 | 11/1997 | Witt et al. | 395/389 |
| 5,758,114 | 5/1998 | Johnson et al. | 395/380 |
| 5,758,116 | 5/1998 | Lee et al. | 395/386 |
| 5,819,059 | 10/1998 | Tran | 395/389 |
| 5,822,558 | 10/1998 | Tran | 395/389 |

| Prefix 0-4 bytes (Optional) 102 | Opcode 1-2 bytes 104 | Mod R/M 0-1 byte (optional) 106 | SIB 0-1 byte (optional) 108 | Displacement 0,1,2,or 4 bytes (optional) 110 | Immediate 0,1,2, or 4 bytes (optional) 112 |

Generic X 86 Instruction Format

FIG. 1A
(PRIOR ART)

|   | mod | reg | r/m |   |   |   |   |
|---|-----|-----|-----|---|---|---|---|
| (a) | 11 | rrr | reg |   |   |   |   |

(b)  mod=00, reg=rrr, r/m=reg (c)  mod=00, reg=rrr, r/m=101, 4-byte offset (d)  mod=01, reg=rrr, r/m=reg, 1-byte offset (e)  mod=10, reg=rrr, r/m=101, 4-byte offset (f)  mod=00, reg=rrr, r/m=100, sci=ss, idx=xxx, base=bbb (g)  mod=00, reg=rrr, r/m=100, sci=ss, idx=xxx, base=bbb, 1-byte offset (h)  mod=00, reg=rrr, r/m=100, sci=ss, idx=xxx, base=bbb, 4-byte offset

FIG. 1C
(PRIOR ART)

| V 502 | Start PTR 504 | End PTR 506 | Valid Mask 508 | MROM/Fast Path 510 | Branch Prediction 512 | Tag Bits 514 |

| Address Bits 600 | Func. Bits 602 | Seg. Limit 604 | Overflow 606 | Instruction Bytes 608 |

METHOD AND APPARATUS FOR PREDECODING VARIABLE BYTE LENGTH INSTRUCTIONS FOR SCANNING OF A NUMBER OF RISC OPERATIONS

BACKGROUND OF THE INVENTION

1. Field of the Invention

This invention relates to superscalar microprocessors and more particularly to the predecoding of variable byte-length computer instructions within high performance and high frequency superscalar microprocessors.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte-length instructions. A generic format illustrative of the x86 instruction set is shown in FIG. 1A. As illustrated in the figure, an x86 instruction consists of from one to four optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (MODRM) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The 80286 sets a maximum length for an instruction at 10 bytes, while the 80386 and 80486 both allow instruction lengths of up to 15 bytes.

Referring now to FIG. 1B, several different variable byte-length x86 instruction formats are shown. The shortest x86 instruction is only one byte long, and comprises a single opcode byte as shown in format (a). For certain instructions, the byte containing the opcode field also contains a register field as shown in formats (b), (c) and (e). Format (j) shows an instruction with two opcode bytes. An optional MODRM byte follows opcode bytes in formats (d), (f), (h), and (j). Immediate data follows opcode bytes in formats (e), (g), (i), and (k), and follows a MODRM byte in formats (f) and (h).

FIG. 1C illustrates several possible addressing mode formats (a)–(h). Formats (c), (d), (e), (g), and (h) contain MODRM bytes with offset (i.e., displacement) information. An SIB byte is used in formats (f), (g), and (h).

The complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, since the x86 instruction set consists of variable byte-length instructions, the start bytes of successive instructions within a line are not necessarily equally spaced, and the number of instructions per line is not fixed. As a result, employment of simple, fixed-length shifting logic cannot in itself solve the problem of instruction alignment.

Superscalar microprocessors have been proposed that employ instruction predecoding techniques to help solve the problem of quickly aligning, decoding and executing a plurality of variable byte-length instructions in parallel. In one such superscalar microprocessor, when instructions are written within the instruction cache from an external main memory, a predecoder appends several predecode bits (referred to collectively as a predecode tag) to each byte. These bits indicate whether the byte is the start and/or end byte of an x86 instruction, the number of microinstructions required to implement the x86 instruction, and the location of opcodes and prefixes. After instructions are fetched from the cache, the superscalar microprocessor converts each instruction to one or more microinstructions referred to as ROPS. The ROPS are similar to RISC instructions in that they are associated with a fixed length and with simple, consistent encodings. The function of each x86 instruction is implemented by one or more ROPs. The number of ROPs required to implement an instruction must be detected prior to multiplexing the instructions to decode units.

The number of ROPs required to implement the x86 instructions are detected and the instructions are multiplexed to decode units based on the predecode bits. The circuitry to detect a number of ROPs and multiplex the instructions to the decode unit based on the number of ROPs is complex and relatively slow. In addition, over fifty percent of the available storage space within the instruction cache array must be allocated for the predecode bits. This accordingly limits the amount of storage within the instruction cache for instruction code and/or increases the cost of the processor due to increased die size.

SUMMARY OF THE INVENTION

The problems outlined above are in large part solved by a method for predecoding variable byte-length instructions in accordance with the present invention. In one embodiment, a predecode unit is provided which is capable of predecoding variable byte-length instructions prior to their storage within an instruction cache. The predecode unit is configured to generate a plurality of predecode bits for each instruction byte. The plurality of predecode bits associated with each instruction byte are collectively referred to as a predecode tag. The predecode bits indicate how many ROPs are required to implement the instruction. The predecode bits are analyzed as early as possible and the byte queue is set-up in terms of ROPs instead of x86 instructions. An instruction alignment unit dispatches the ROPs to a plurality of decode units which form fixed issue positions within the superscalar microprocessor. Because the byte queue is set-up in terms of ROPs, the circuitry to multiplex the ROPs to the decode units is simplified and faster. The instruction alignment circuitry is no longer required to detect and analyze the number of ROPs required to implement the instruction. This task is accomplished prior to loading the instructions in the byte queue.

In one embodiment, an instruction scanning unit identifies x86 instructions and the number of ROPs associated with the x86 instructions. An byte queue holds the x86 instructions and ROP identification information identifying each ROP required to implement the x86 instruction. The instruction alignment unit dispatches the ROPs to decode units based on the ROP identification information. The decode units receive both the x86 instruction and a tag indicating which ROP of the x86 instruction to decode.

In one implementation, the predecode unit generates four predecode bits associated with each byte of instruction code: a "start" bit, an "end" bit, a "functional" bit, and a "ROP" bit. The start bit is set if the associated byte is the first byte of the instruction. Similarly, the end bit is set if the byte is the last byte of the instruction. Rather than associating a dedicated meaning to the functional bit, the predecode unit is configured such that the meaning conveyed by or associated with the functional bit is dependent both upon its state (i.e., whether the functional bit is set or not) and upon the state of the start bit for that byte. The meaning of the functional bit may further be dependent upon the status of the start bit of a previous instruction byte. For example, in one implementation, if the start bit for a particular byte is set, the functional bit indicates whether the instruction is a directly decodeable "fast path" instruction or is an MROM instruction (i.e., an instruction to be serialized through microcode). On the other hand, if the start bit for a particular byte is cleared and if the byte immediately follows a start byte (i.e., an instruction byte whose start bit is set), the functional bit indicates whether the opcode is the first byte of the instruction or whether a prefix is the first byte of the instruction. If the start bit for the byte is cleared and the byte does not follow a start byte, the functional bit indicates whether the associated byte is either a MODRM or an SIB byte, or is displacement or immediate data.

The predecode unit is configured such that the meaning conveyed by or associated with the ROP bit is dependent on the state of the end bit. The meaning of the ROP bit may further be dependent upon the status of the ROP bit of the preceding byte. For example, in one embodiment, if the end bit for a particular byte is set, the ROP bit indicates whether the instruction is a one ROP or two ROP instruction. If, however, the ROP bit of the byte preceding the end byte is set then the ROP bit indicates that the instruction is a three ROP instruction.

By utilizing the predecode tag, instructions can be identified in the byte queue based on the number of ROPs required to implement the instruction and the instruction alignment unit may be implemented with a relatively small number of cascaded levels of logic gates, thus accommodating very high frequencies of operation. The plurality of decode units, to which the variable byte length instructions are aligned, utilize the predecode tags to attain relatively fast decoding of the instructions. Since the predecode unit is configured such that the meaning of the functional bit of a particular predecode tag is dependent upon the status of the start bit and the meaning of the ROP bit is dependent on the status of the end bit, a relatively large amount of predecode information may be conveyed with a relatively small number of predecode bits. This thereby allows a reduction in the size of the instruction cache without compromising performance.

Furthermore, with the information conveyed by the functional bits, the decode units know the exact locations of the opcode, displacement, immediate, register, and scale-index bytes. Accordingly, no serial scan by the decode units through the instruction bytes is needed. In addition, the functional bits allow the decode units to calculate the 8-bit linear addresses (via adder circuits) expeditiously for use by other subunits within the superscalar microprocessor. Accordingly, relatively fast decoding may be attained, and high performance may be accommodated.

BRIEF DESCRIPTION OF THE DRAWINGS

Other objects and advantages of the invention will become apparent upon reading the following detailed description and upon reference to the accompanying drawings in which:

FIG. 1A is a diagram which illustrates the generic x86 instruction set format.

FIG. 1C is a diagram which illustrates several possible x86 addressing mode formats.

Figure 1B:
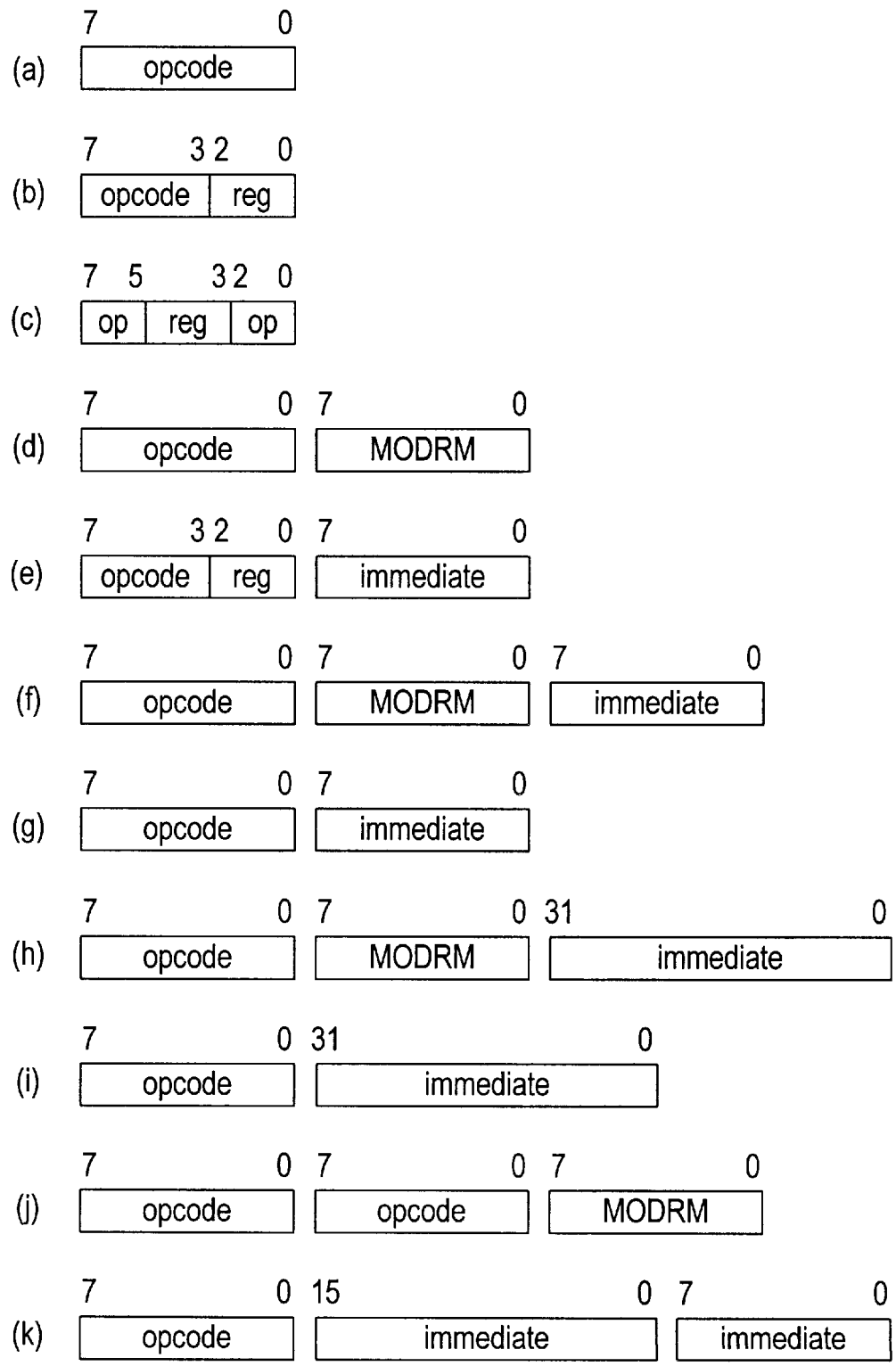
FIG. 1B is a diagram which illustrates several different variable byte-length x86 instruction formats.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
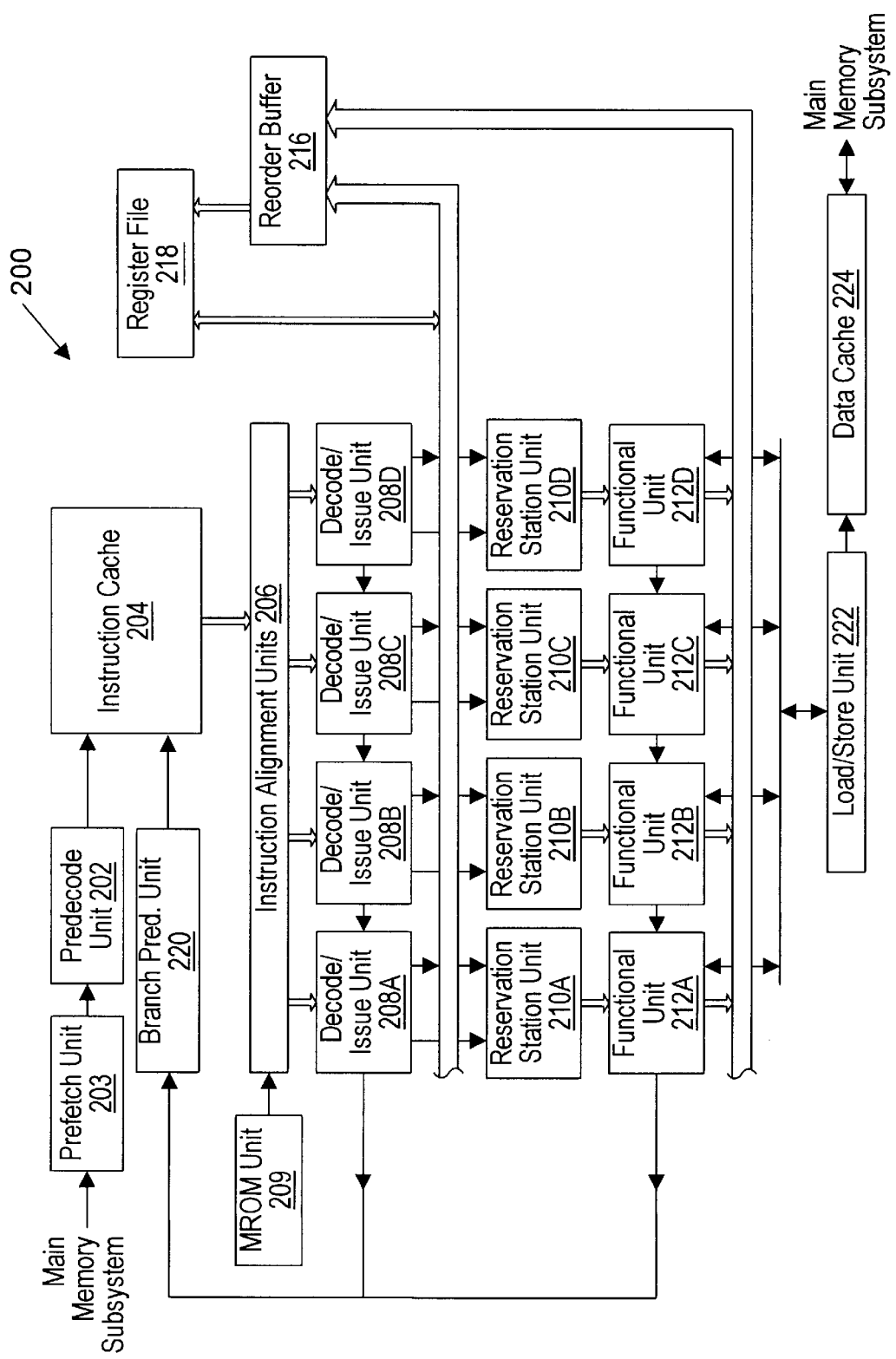
FIG. 2 is a block diagram of a superscalar microprocessor which includes an instruction alignment unit to forward multiple instructions to four decode units.

Referring next to FIG. 2, a block diagram of a superscalar microprocessor 200 including a predecode unit 202 which operates in accordance with a method of the present invention is shown. As illustrated in the embodiment of FIG. 2, superscalar microprocessor 200 includes a predecode unit 202 and a branch prediction unit 220 coupled to an instruction cache 204. A prefetch unit 203 is coupled to predecode unit 202. An instruction alignment unit 206 is coupled between instruction cache 204 and a plurality of decode units 208A–208D (referred to collectively as decode units 208). Each decode unit 208A–208D is coupled to a respective reservation station 210A–210D (referred collectively as reservation stations 210), and each reservation station 210A–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 32 bytes each (where each byte consists of 8 bits). During operation, instruction code is provided to instruction cache 204 by prefetching code from a main memory (not shown) through prefetch unit 203. For each byte of instruction code, instruction cache 204 further stores a predecode tag associated therewith. It is noted that instruction cache 204 could be implemented in a set-associative, a fully-associative, or a direct-mapped configuration.

Prefetch unit 203 is provided to prefetch instruction code from the main memory for storage within instruction cache 204.

In one embodiment, prefetch unit 203 is configured to burst 64-bit wide code from the main memory into instruction cache 204. It is understood that a variety of specific code prefetching techniques and algorithms may be employed by prefetch unit 203.

As prefetch unit 203 fetches instructions from the main memory, predecode unit 202 generates four predecode bits associated with each byte of instruction code: a "start" bit, an "end" bit, a "functional" bit, and an "ROP" bit. The start bit as well as the end bit of each byte are indicative of the boundaries of an instruction. The functional bit of each byte conveys additional information regarding the byte or the instruction such as whether the instruction can be decoded directly by decode units 208 or whether the instruction must be executed by invoking a microcode procedure controlled by MROM unit 209 (as will be described in greater detail below), whether the byte is a MODRM or SIB byte or whether the byte is displacement or immediate data. The functional bit may further be employed to indicate the location of an opcode byte. It will be appreciated from the following that the encoded meaning of the functional bit of a particular instruction byte is dependent upon the associated start bit. The ROP bit of each byte conveys information regarding the number of ROPs required to implement an instruction.

Table 1 indicates one encoding of the start, end and functional bit as implemented by predecode unit 202. As indicated within the table, if a given byte is the first byte of an instruction, the start bit for that byte is set by predecode unit 202 as the byte is fetched from main memory and stored within instruction cache 204. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, as well as whether the byte contains displacement or immediate data.

TABLE 1

Encoding of Start, End and Functional Bits.

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | MODRM or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

In accordance with Table 1 above, it is noted that the predecode unit 202 of superscalar microprocessor 200 is configured to generate a functional bit for each byte of instruction code. The meaning of the functional bit is dependent upon the value of the start bit associated with that byte. For the encoding scheme illustrated in Table 1, the meaning of the functional bit is further dependent upon the value of the start bit associated with a previous instruction byte.

For the specific implementation described above, it will be appreciated that the functional bit indicates whether the instruction is a directly decodeable instruction or an MROM instruction (described further below) if the start bit for that byte is set. If the start bit associated with a particular byte of instruction code is cleared and immediately follows a byte of instruction code in which the start bit was set, the functional bit indicates whether the opcode is the first byte or whether a prefix is the first byte. Still further, if the start bit for a byte of instruction code is cleared and the previous byte's start bit was also cleared, the functional bit indicates whether the byte is a MODRM or SIB byte, or whether the byte is displacement or immediate data. For subsequent bytes within a particular instruction, the second functional bit set in bytes 3–8 indicates immediate data.

In one embodiment, the ROP bit is encoded to indicate whether a particular instruction is implemented by one, two or three ROPs. Instructions that are not capable of being executed in three ROPs are designated as MROM instructions (MROM instructions are discussed in more detail below). The ROP bit of the end byte and the ROP bit of the byte that immediately precedes the end byte indicate the number of ROPs required to implement an instruction. If the instruction is a one ROP instruction, the ROP bit of the end byte is cleared. If the instruction is a two ROP instruction, the ROP bit of the end byte is set. If the instruction is a three ROP instruction, the ROP bit of the end byte is set and the ROP bit of the byte that immediately precedes the end byte is set. For the purpose of this disclosure, the byte that immediately precedes the end byte is the second-to-last byte of the instruction. If the instruction is an MROM instruction, the ROP bit of the end byte should be cleared. Because the above encoding requires two bytes to identify a three ROP instruction, the above encoding does not work for a single byte x86 instruction implemented by three ROPs. Accordingly, single byte instructions implemented by three ROPs are designated as MROM instructions.

In accordance with the predecode scheme employed by the superscalar microprocessor 200 as described above, a predecode tag is generated which is associated with each byte of instruction code. Both predecode tags and the instruction code are stored within instruction cache 204 for subsequent processing by the superscalar microprocessor. Since the meaning of the functional bit and the ROP bit are dependent upon the start bit and the end bit of a particular byte and upon the start bits and end bits of previous bytes, a relatively large amount of predecode information can be conveyed to the instruction alignment unit 206 and to decode units 208 to attain relatively fast alignment and decode of instructions. Since the number of bits required within the predecode tag is relatively small, the required size of the instruction cache 204 may be reduced without compromising performance.

Furthermore, with the information conveyed by the functional bits, the decode units know the exact locations of the opcode, displacement, immediate, register, and scale-index bytes. Accordingly, no serial scan by the decode units through the instruction bytes is needed. In addition, the functional bits allow the decode units to calculate the 8-bit linear addresses (via adder circuits) expeditiously for use by other subunits within the superscalar microprocessor. Accordingly, relatively fast decoding may be attained, and high performance may be accommodated.

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. When an MROM instruction is encountered, MROM unit 209 parses and serializes the instruction into a subset of defined fast path instructions to effectuate a desired operation.

Instruction alignment unit 206 is provided to multiplex x86 instructions from instruction cache 204 to fixed issue positions formed by decode units 208A–208D. Instruction alignment unit 206 is configured to channel instruction code to designated decode units 208A–208D depending upon the locations of the start bytes of instructions within a line as delineated by instruction cache 204 and the number of ROPs required to implement an instruction.

Before proceeding with a description of the alignment of instructions from instruction cache 204 to decode units 208, general aspects regarding other subsystems employed within the exemplary superscalar microprocessor 200 of FIG. 2 will be described. For the embodiment of FIG. 2, each of the decode units 208 includes decoding circuitry for decoding the ROP instructions referred to above. In addition, each decode unit 208A–208D routes displacement and immediate data to a corresponding reservation station unit 210A–210D.

Output signals from the decode units 208 include bit-encoded execution instructions for the functional units 212 as well as operand address information, immediate data and/or displacement data.

The superscalar microprocessor of FIG. 2 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208D are routed directly to respective reservation station units 210A–210D. In one embodiment, each reservation station unit 210A–210D is capable of holding instruction information (i.e., bit encoded execution bits as well as operand values, operand tags and/or immediate data) for up to three pending instructions awaiting issue to the corresponding functional unit. It is noted that for the embodiment of FIG. 2, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP), as will be described further below. Reorder buffer 216 contains temporary storage locations for results which change the contents of these registers to thereby allow out of order execution. A temporary storage location of reorder buffer 216 is reserved for each instruction which, upon decode, modifies the contents of one of the real registers. Therefore, at various points during execution of a particular program, reorder buffer 216 may have one or more locations which contain the speculatively executed contents of a given register. If following decode of a given instruction it is determined that reorder buffer 216 has previous location(s) assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions. Each of the four reservation stations 210A–210D contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a store buffer with eight storage locations for data and address information for pending loads or stores. Functional units 212 arbitrate for access to the load/store unit 222. When the buffer is full, a functional unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Figure 3:
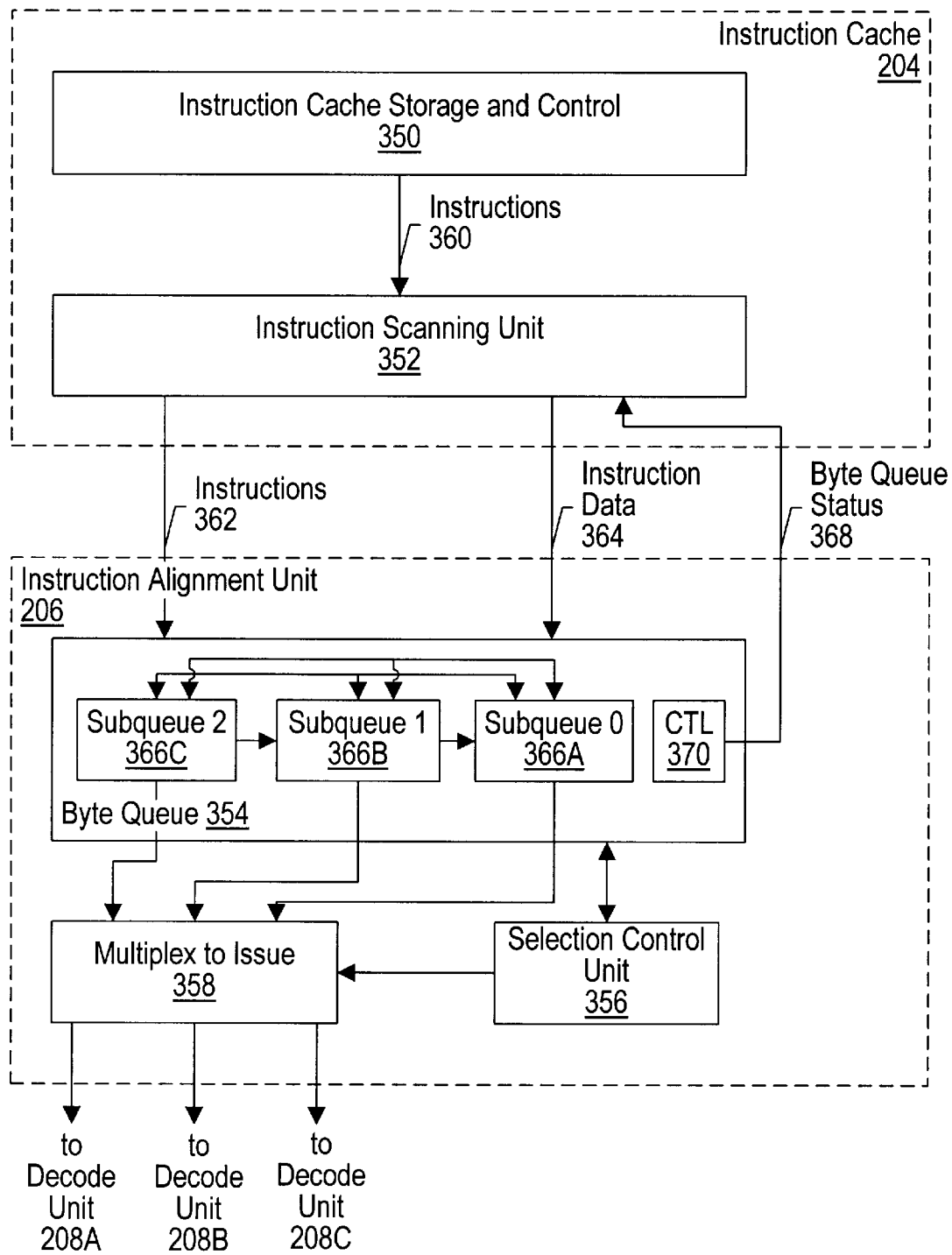
FIG. 3 is a block diagram of one embodiment of an instruction cache and an instruction alignment unit.

Turning now to FIG. 3, a block diagram of one embodiment of instruction cache 204 and instruction alignment unit 206 is shown. Instruction cache 204 includes an instruction cache storage and control block 350 and an instruction scanning unit 352. Instruction alignment unit 206 includes a byte queue 354, a selection control unit 356, and a multiplex to issue block 358.

Instruction cache storage and control block 350 includes storage for instruction cache lines and related control circuitry for fetching instructions from the storage, for selecting cache lines to discard when a cache miss is detected, etc. Instruction cache storage and control block 350 receives fetch addresses from branch prediction unit 220 (not shown) in order to fetch instructions for execution by microprocessor 200. Instruction bytes fetched from instruction cache storage and control block 350 are conveyed to instruction scanning unit 352 upon an instructions bus 360. Instruction bytes are conveyed upon instructions bus 360, as well as corresponding predecode data (e.g. start, end, functional, and ROP bits). In one embodiment, sixteen bytes stored in contiguous memory locations are conveyed upon instructions bus 360 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 352 receives information regarding the bytes within the sixteen bytes which are to be conveyed as instructions to instruction alignment unit 206. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 220 predicts the branch taken, then bytes subsequent to the branch instruction within the sixteen bytes are ignored.

Instruction scanning unit 352 scans the predecode data associated with the bytes which are to be conveyed as instructions to instruction alignment unit 206. Instruction scanning unit 352 divides the sixteen bytes conveyed by instruction cache storage and control block 350 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 350, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 352 scans the predecode data of each portion of the instructions independently and in parallel. Instruction scanning unit 352 identifies up to a predefined maximum number of instructions within each portion from the start and end byte information included within the predecode data. For the present embodiment, the predefined maximum number is three. Instruction scan unit 352 further identifies up to a predetermined number of ROPs from the identified instructions based on the predecode bits. For the present embodiment, the predefined maximum number of ROPs is six. Therefore, instruction scan unit 352 scans for three x86 instructions and then scans for six ROPs from those instructions. Generally speaking, instruction scanning unit 352 preferably identifies a maximum number of ROPs in each portion equal to or greater than the number of issue positions included within microprocessor 200. In the present embodiment, up to six ROPs are each scanning cycle.

The instruction bytes and ROP identification information generated by instruction scanning unit 352 are conveyed to byte queue 354 upon an instructions bus 362 and an ROP data bus 364, respectively. The instruction bytes are conveyed as eight byte portions, and the ROP data is arranged accordingly such that each eight byte portion is associated with a portion of the ROP identification information conveyed upon ROP data bus 364. The ROP identification information identifies the location of an instruction within the instruction byte and identifies the ROPs required to implement those instructions. Each eight byte portion and the corresponding ROP identification information forms an instruction block. It is noted that, although an instruction block includes eight bytes in the present embodiment, instruction blocks may include any number of bytes in various embodiments. Byte queue 354 receives the instruction blocks conveyed and stores them into one of multiple subqueues included therein. In the embodiment shown, byte queue 354 includes three subqueues: a first subqueue 366A, a second subqueue 366B, and a third subqueue 366C. First subqueue 366A stores the instruction block which is foremost among the instruction blocks stored in byte queue 354 in program order. Second subqueue 366B stores the instruction block which is second in program order, and third subqueue stores the instruction block which is third in program order.

If a particular eight byte portion as scanned by instruction scanning unit 352 includes more than the maximum predefined number of instructions or more than the maximum predefined number of ROPs, then the particular eight byte portion is retained by instruction scanning unit 352. During the following clock cycle, the particular eight byte portion is scanned again. The predecode data corresponding to the previously identified instructions is invalidated such that instruction scanning unit 352 detects the additional instructions and ROPs. For the present embodiment, the ROPs are detected only from the identified instructions. For example, if three one-ROP instructions are identified then only three ROPs are conveyed to byte queue 354 during that clock cycle. Other ROPs are identified in the following clock cycle. If three three-ROP instructions are identified, the six ROPs from the first two instructions will be conveyed to byte queue 354 and the ROPs of the third instruction are delayed until the next cycle. It is apparent, that instruction scan unit 352 may be designed to identify ROPs from all the instruction bytes rather than just the instruction bytes that make up the first three identified instructions.

If the other eight byte portion concurrently received with the particular eight byte portion is subsequent to the particular eight byte portion retained by instruction scan unit 352, then the other eight byte portion is rescanned as well. Byte queue 354 discards the instruction blocks received from the other eight byte portion, in order to retain program order among the instruction blocks stored in the byte queue.

A control unit 370 within byte queue 354 conveys a byte queue status upon byte queue status bus 368 to instruction scanning unit 352. Byte queue status bus 368 includes a signal corresponding to each subqueue 366. The signal is asserted if the subqueue 366 is storing an instruction block, and deasserted if the subqueue 366 is not storing an instruction block. In this manner, instruction scanning unit 352 may determine how many instruction blocks are accepted by byte queue 354 during a clock cycle. If two instruction blocks are conveyed during a clock cycle and only one instruction block is accepted, instruction scanning unit 352 retains the rejected instruction block and rescans the instruction block in the subsequent clock cycle.

In one embodiment, the ROP identification information for each ROP includes: (i) start and end pointers identifying the bytes at which the identified instruction begins and ends within the eight bytes; (ii) a valid mask containing eight bits, one for each of the eight bytes; (iii) a bit indicative of whether the instruction is MROM or fast path; (iv) an instruction valid bit indicating that the instruction is valid and an overflow bit for the last instruction indicating that it is an overflow; and (v) tag bits indicating which ROP of the instruction is represented. The valid mask includes a binary one bit corresponding to each byte included within the particular instruction (i.e. the bits between the start pointer and end pointer, inclusive, are set). Zero bits are included for the other bytes. Additional information conveyed with the ROP identification information is the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 350 except for the branch prediction, which is provided by branch prediction unit 220.

Selection control unit 356 examines the ROP identification information stored in each subqueue to generate selection controls for multiplex to issue block 358. Multiplex to issue block 358 includes a plurality of multiplexors for selecting ROPs from byte queue 354 for conveyance to each of decode units 208. Byte queue 354 maintains certain properties with respect to each subqueue 366 in order to simplify the selection logic within selection control unit 356, as will be explained in more detail below.

It is noted that MROM instructions are identified by instruction scanning unit 352 as well. Instruction scanning unit 352 routes the MROM instructions to MROM unit 209 (not shown). However, the MROM instructions may flow through instruction alignment unit 206 as well. In this manner, instruction alignment unit 206 may detect the MROM instruction and convey it to decode units 208 without any other instructions.

Figure 4:
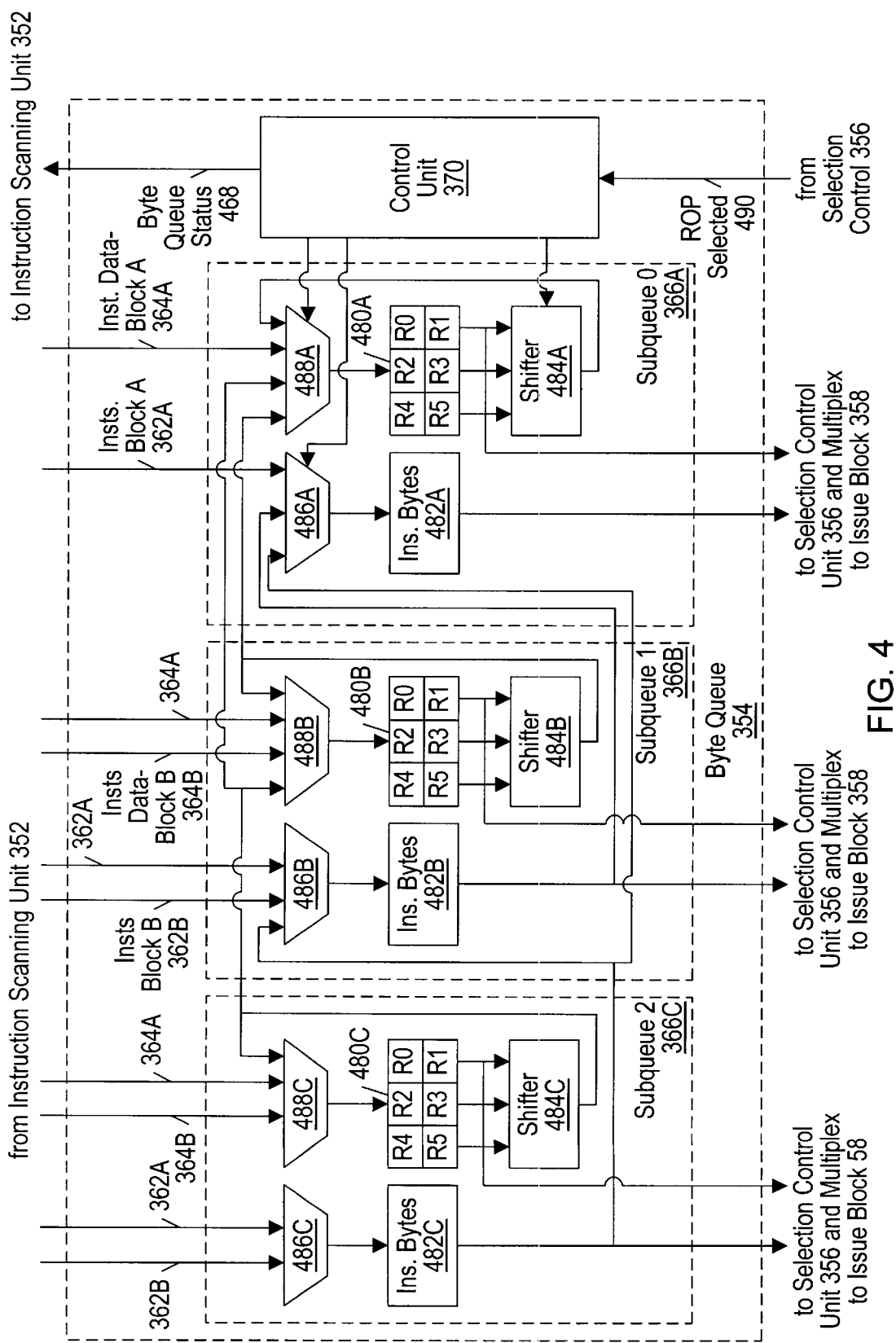
FIG. 4 is a block diagram of one embodiment of a byte queue.

Turning now to FIG. 4, a block diagram of one embodiment of byte queue 354 is shown. Subqueues 366 are shown in more detail, and control unit 370 is shown as well. First subqueue 366A includes an ROP position storage 480A, an instruction bytes storage 482A, a shifter block 484A, and a pair of multiplexors 486A and 488A. Second subqueue 366B and third subqueue 366C include similar elements, numbered with like reference numbers postfixed with a "B" and a "C", respectively. The elements and operation of first subqueue 366A will be described in detail, and the elements and operations of second subqueue 366B and third subqueue 366C are similar.

In general, byte queue 354 is organized in terms of ROPs. Byte queue 354 dispatches both the x86 instruction and a set of tag bits designating one ROP of the x86 instruction to the issue positions. Byte queue 354 may issue the same x86 instruction to two different issue positions with different tag bits. The issue positions each execute one ROP of the x86 instruction. The tag bits identify which ROP to execute. For example, byte queue 354 may issue an x86 instruction with a tag of 0 to one issue position and the same x86 instruction with a tag of 1 to another issue position. The first issue position executes the first ROP of the x86 instruction and the second issue position executes the second ROP of the x86 instruction. Instruction bytes storage 482 stores the instruction bytes from instruction scan unit 352. ROP position storage 480 stores information to locate an instruction within instruction bytes storage 482 and to designate an ROP of the instruction. Therefore ROP instruction storage 480 maintains information about both the x86 instruction and the ROP.

ROP position storage 480A includes storage for ROP identification information corresponding to each ROP within the instruction block stored therein. In the present embodiment, up to six ROPs may be stored in an instruction block. Therefore, six positions are included within ROP position storage 480A. The first position (labeled R0) stores the ROP identification information corresponding to the first ROP of the instruction which is foremost in program order within the instruction block. The second position (labeled R1) stores the ROP identification information corresponding to the second ROP, which may be the first ROP in the second instruction or the second ROP in the first instruction depending on the number of ROPs required to implement the first instruction. The third position (labeled R2) stores the ROP identification information corresponding to the third ROP, etc.

Control unit 370 maintains the information stored in each subqueue 366. In particular, control unit 370 directs shifter block 484 to shift ROP identification information between the positions when instruction are selected for dispatch. For example, if the ROP corresponding to position R0 is dispatched, the information stored in position R1 is shifted into position R0 and the information stored in position R2 is shifted into position R1. Similarly, if the ROPs corresponding to positions R0 and R1 are dispatched, then information stored in position R2 is shifted into position R0. In this manner, the ROP within the subqueue which is foremost in program order is maintained in position R0, the ROP which is second in program order is maintained in position R1, etc.

ROP identification information is shifted internally to each subqueue 366 independently. ROP identification information is not, therefore, shifted from position R0 of subqueue 366B into positions within subqueue 366A. Instead, when each of the ROPs within subqueue 366A have been dispatched, subqueue 366B is shifted into subqueue 366A as a whole. The logic for shifting between subqueues 366 may operate independently from and in parallel with the internal shifting of each subqueue 366A–366C.

Control unit 370 receives an indication of the ROPs selected for dispatch from selection control unit 356 upon an ROP selected bus 490. For example, a signal may be included for each position within position storages 480. The signal may be asserted if the ROP corresponding to the position is selected. Control unit 370 may direct each shifter block 484A–484C dependent upon the selection signals associated with that instruction block. Alternatively, the signal corresponding to the last ROP in program order to be selected for dispatch may be asserted. Positions prior to the position storing the last ROP are shifted out. For example, if an ROP from position R0 of subqueue 366A is selected for dispatch, then shifter block 484A is directed to shift position R1 into position R0 and position R2 into position R1. Additionally, control unit may direct the shifting of one subqueue into another subqueue based upon the stored ROP identification information and the instructions selected. For example, if positions R0 and R1 of subqueue 366A have been selected for dispatch and position R2 is invalid, then subqueue 366B may be shifted into subqueue 366A (and subqueue 366C may be shifted into subqueue 366B). If the valid instructions within subqueue 366B have been dispatched as well, then subqueue 366C may be shifted into subqueue 366A.

Control unit 370 provides control signals to shifter blocks 484A–484C and multiplexors 486A–486C and 488A–488C in order to cause the appropriate shifting to occur. Control signals are shown in FIG. 4 coupled between control unit 370 and shifter block 484A, multiplexor 486A, and multiplexor 488A. Control signals between shifter blocks 484B–484C, multiplexors 486B–486C, and multiplexors 488B–488C have been omitted from FIG. 4 for clarity.

In the present embodiment, up to two instruction blocks may be conveyed to byte queue 354 during a clock cycle. The first instruction block is conveyed upon a portion of instruction bus 362 and ROP data bus 364, shown in FIG. 4 as instructions block A bus 362A and instruction data-block A bus 364A. Similarly, the second instruction block is conveyed upon instructions block B bus 362B and instruction data-block B bus 364B. Because first subqueue 366A stores the instruction block which is foremost in program order, first subqueue 366A receives instructions block A bus 362A and instruction data-block A bus 364A. Second subqueue 366B and third subqueue 366C may receive either instruction block and therefore receive both sets of buses upon which the instruction blocks are conveyed.

For first subqueue 366A, instructions block A bus 362A is coupled to multiplexor 486A. Multiplexor 486A provides the information stored in instruction bytes storage 482A, to which multiplexor 486A is coupled. Multiplexor 486A also receives the information stored in instruction bytes storages 482B and 482C, to allow for shifting of the contents of second subqueue 366B or third subqueue 366C into first subqueue 366A. As mentioned above, such shifting is performed when each of the instructions from the instruction block stored in subqueue 366A have been dispatched.

Similarly, multiplexor 488A provides the information stored in ROP position storage 480A. Therefore, instruction data A bus 364A is coupled thereto. Additionally, the output of shifter blocks 484B and 484C are coupled to multiplexor 488A for allowing shifting between the subqueues. The output of shifter blocks 484B and 484C are selected so that shifting internal to the subqueue may be performed in parallel with shifting one subqueue's information into another. For example, the remaining instructions within first subqueue 366A may be dispatched concurrently with the instruction from position R0 of second subqueue 366B. Therefore, the information in subqueue 366B is shifted such that the information in position R1 is shifted into R0 (and possibly the information from position R2 into R1). Concurrently, the information in subqueue 366B is shifted into subqueue 366A. By selecting the output of shifter block 484B, the shifted position information is conveyed to first subqueue 366A. Therefore, the internal shifting of the subqueue and the shifting of the information into another subqueue have both been performed. Additionally, the two shifting activities are independent of one another. Internal shifting of a particular subqueue is determined based upon the number of ROPs dispatched from that subqueue. Shifting from a particular subqueue into another subqueue is selected if the other subqueue is emptied via the ROPs dispatched during a clock cycle.

Finally, multiplexor 488A receives the output of shifter block 484A. When ROPs have been dispatched from first subqueue 366A but ROPs still remain within first subqueue 366A, shifter block 484A supplies the shifted position information to ROP position storage 480A. It is noted that the function of each shifter block 484A–484C may be incorporated into the multiplexors 488 which receive the output of that shifter block 484A–484C.

As noted above, control unit 370 provides a byte queue status to instruction scanning unit 352 upon byte queue status bus 368. Control unit 370 may determine the status to convey based upon the ROP identification information stored in each subqueue 366 and the corresponding instruction selection information conveyed upon ROP selection bus 490. In particular, if third subqueue 366C does not contain any valid instructions or the information is being shifted to another subqueue 366, then the signal associated with subqueue 366C is deasserted upon byte queue status bus 368. Similarly, if second subqueue 366B does not contain any valid instructions or the instructions have been dispatched and third subqueue 366C does not contain any valid ROPs which have not been dispatched, then the signal corresponding to second subqueue 366B is deasserted. The signal associated with first subqueue 366A may be handled similarly.

Information from instruction bytes storages 482 and ROP position storages 480 are conveyed to both selection control unit 356 (for examination) and to multiplex to issue block 358 (for multiplexing to a particular decode unit 208). Since instruction bytes storages 482 store certain ROP identification information which is shared by each of the positions, a portion of the information stored therein is examined by selection control unit 356. Additionally, certain information in the ROP identification information is used by decode units 208, and therefore is multiplexed to the decode unit along with the corresponding instruction bytes.

Figures 5, 6:
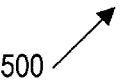
FIG. 5 is a diagram of ROP information stored with respect to each ROP within a subqueue of the byte queue.
FIG. 6 is a diagram of instruction information stored with respect to an instruction block within a subqueue of the byte queue.

Turning now to FIG. 5, a diagram depicting exemplary information stored in a position 500 of a position storage 480, according to one embodiment. For example, position 500 may be position R0, R1, R2, R3, R4, R5 or R6. Each position stores equivalent information regarding different ROPs and the instructions associated with those ROPs. The instruction and ROP information are collectively referred to as instruction identification information. Position 500 stores a valid indication 502, a start pointer 504, an end pointer 506, a valid mask 508, an MROM/fast path indication 510, a branch prediction indication 512, and tag bits 514.

Valid indication 502 identifies the validity or invalidity of the remainder of the information stored in position 500. If the valid indication indicates validity, then ROP identification information is stored in position 500. If the valid indication indicates invalidity, then ROP identification information is not stored within position 500 (i.e. position 500 is empty). In one embodiment, valid indication 502 comprises a bit indicative, when set, that ROP identification information is stored within position 500. When clear, the bit indicates that ROP identification information is not stored within position 500.

Start pointer 504 and end pointer 506 locate the byte positions within the instruction block at which the instruction associated with the ROP identified in position 500 begins and ends, respectively. For embodiments in which an instruction block includes 8 bytes, start pointer 504 and end pointer 506 each comprise three bit values indicating the numerical position between zero and seven of the respective start or end point. Valid mask 508 is a mask of zeros and ones. Each bit in the mask corresponds to one of the bytes within the instruction block. Bits in the mask corresponding to bytes not included within the instruction identified by position 500 are set to zero. Conversely, bits in the mask corresponding to bytes included within the instruction are set to one. For example, if the instruction identified by position 500 begins at the third byte within the instruction block and ends at the fifth byte within the instruction block, the start pointer is 050, the end pointer is 500, and the mask is 00111000 (all expressed in binary format). The start pointer, end pointer, and mask are used by selection control unit 356 to generate selection controls for multiplex to issue block 358 when an ROP from that instruction is selected for issue.

MROM/fast path indication 510 indicates the MROM or fast path nature of the instruction associated with the ROP identified by position 500. In one embodiment, indication 510 comprises a bit indicative, when set, that the instruction is an MROM instruction. When clear, the bit indicates that the instruction is a fast past instruction. Fast path instructions may be selected concurrently with other fast path instructions, while MROM instructions are selected without any other concurrent instructions being selected. Indication 510 is used by selection control unit 356 during instruction selection to enforce the separation of MROM instructions from fast path instructions. Branch prediction indication 512 comprises a bit indicative, when set, that the instruction is a branch instruction which is predicted taken. When clear, the bit indicates that the instruction is either not a branch instruction or is a branch instruction predicted not taken. In one embodiment, reorder buffer 216 limits the number of predicted-taken branches which may be concurrently dispatched (i.e. within the same line in reorder buffer 216) to one. Therefore, selection control unit 356 uses branch prediction indication 512 to detect a pair of predicted-taken branches which would otherwise be concurrently dispatched.

Tag bits 514 indicate which ROP of the associated instruction this position holds. In one embodiment, instructions can be one, two or three ROPs. Therefore, tag bits 514 may be represented by two bits indicating whether this is the first, second or third ROP of an instruction. Multiple ROP positions may correlate to the same instruction. For example, one ROP position may hold the first ROP of an instruction and another ROP position may hold the second ROP of an instruction. In this case, start pointer 504, end pointer 506, valid mask 508, and MROM/fast path indication 510 may be identical. Tag bits 514 indicate which ROP required to implement an instruction this ROP position holds. Tag bits 514 are used by decoders 208 to indicate which ROP of an instruction to decode and issue.

Turning now to FIG. 6, a diagram depicting exemplary information stored in instruction bytes storages 482 is shown, according to one embodiment. An address bits field 600, a functional bits field 602, a segment limit field 604, an overflow indication 606, and an instruction bytes field 608 are included. Address bits field 600 stores a pair of address bits which identify the quarter of the cache line from which the instruction block was fetched. Functional bits field 602 stores the original functional bits from the predecode data associated with the instruction bytes within the instruction block.

Segment limit field 604 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signaled. Microprocessor 200 may handle segment limit violations as follows: if an entire set of instructions fetched from instruction cache 204 during a clock cycle lies outside the code segment, the instructions are not conveyed to instruction alignment unit 206. Instead, the segment limit violation is signaled to reorder buffer 216. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 204. Segment limit field 604 is included for handling this case. If the limit is crossed within the instruction block stored in instruction bytes storage 482, then segment limit field 604 indicates which byte position represents the segment limit. In one embodiment, segment limit field 604 comprises three bits to indicate a limit at one of the eight bytes within the instruction block. If an instruction beyond the limit imposed by segment limit field 604 is dispatched, an exception is signaled to reorder buffer 216.

Overflow indication 606 indicates that one of the instructions within the instruction block overflows into the subsequent instruction block. Information regarding the overflowing instruction is stored in position R6 of the corresponding ROP position storage 480, and is not shifted from position R6 to other positions. In one embodiment, overflow indication 606 comprises a bit indicative, when set, that an instruction within the instruction block overflows. When clear, the bit indicates that no instruction within the instruction block overflows. If overflow indication 606 is set, then the valid indication within position R6 is clear. Alternatively, overflow indication 606 is clear if the valid indication within position R6 is set. In this manner, position R6 is indicated either to store an overflow instruction or a valid instruction ending within the instruction block, but not both. Additionally, position R6 is indicated to be not storing an instruction if both overflow indication 606 and the valid indication for position R6 are clear. Instruction bytes field 608 stores the actual instruction bytes included within the instruction block. In one embodiment, instruction bytes field 608 is eight bytes wide.

Figure 7:
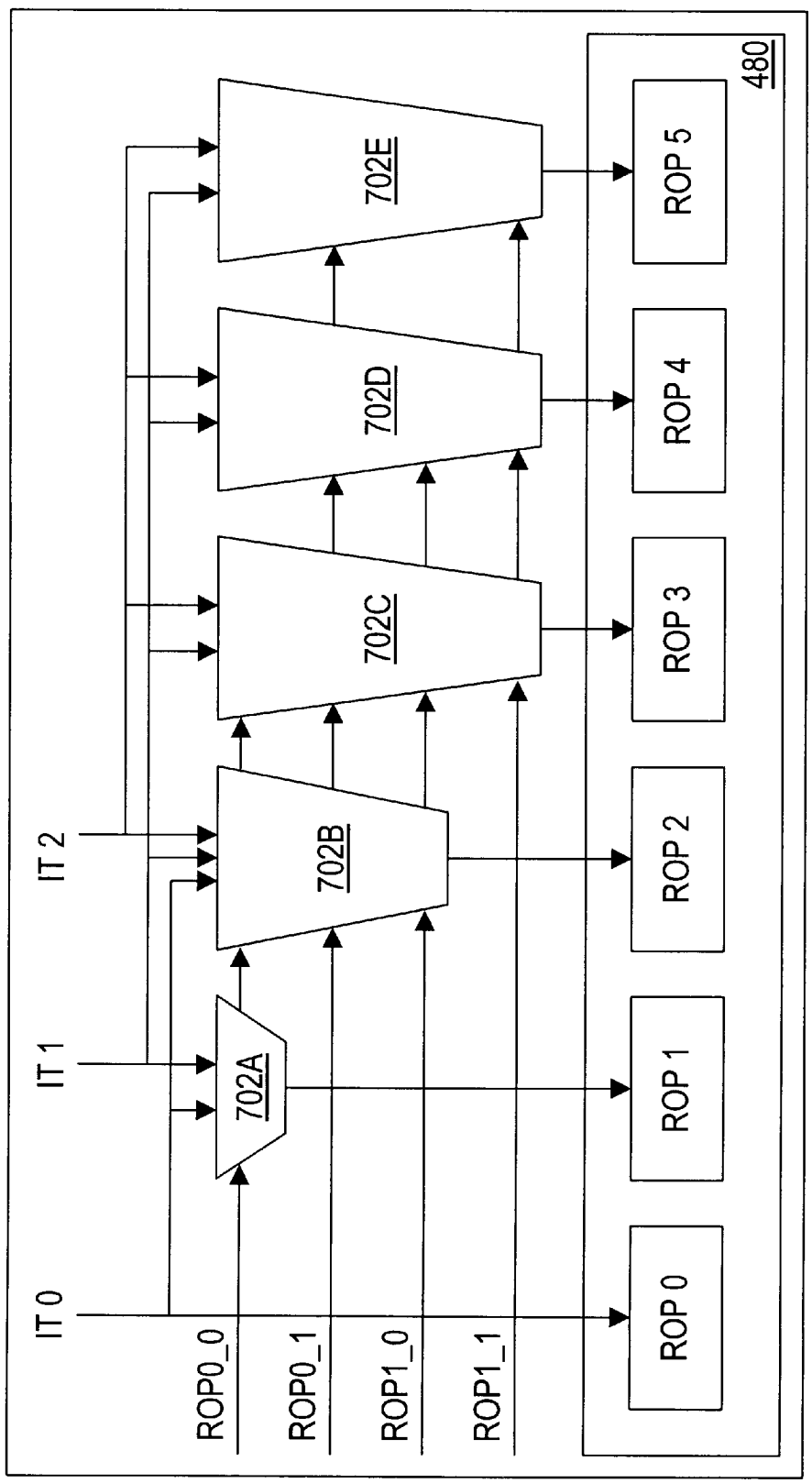
FIG. 7 is a block diagram of a multiplexor circuit for routing instruction information to an ROP position storage device.

As discussed above, each ROP position holds similar data regarding the instruction associated with that ROP. For example, if R0 and R1 are two ROPs from the same instruction, start pointer 504, end pointer 506, valid mask 508, and MROM/fast path indication 510 (collectively referred to as instruction information) will be the same for both position R0 and R1. FIG. 7 illustrates a block diagram for routing the instruction information to each ROP position.

Referring now to FIG. 7, a plurality of a multiplexors 702A–702E route instruction information to ROP position storage 480. Multiplexors 702 receive control signals from the ROP bits of the end bytes and the bytes that immediately precede the end bytes. Based on these control signals, multiplexors 702 route instruction information to the ROP positions. ROP0_0 represents the ROP bit of the end byte of the first instruction identified by instruction scanning unit 352. ROP0_1 represents the ROP bit of the byte that precedes the end byte of the first instruction identified by instruction scanning unit 352. ROP1_0 represents the ROP bit of the end byte of the second instruction identified by instruction scanning unit 352. ROP1_1 represents the ROP bit of the byte that precedes the end byte of the second instruction identified by instruction scanning unit 352.

In the embodiment shown in FIG. 7, instruction information for the first instruction (II0) 704 is always routed to ROP0. II0 704 is also routed to R1 if ROP0_0 is asserted (indicating that the first instruction is either a two or three ROP instruction). II0 704 is also routed to R2 if ROP0_0 and ROP0_1 are both asserted (indicating the instruction is a three ROP instruction). II1 706 is routed to R1 if ROP0_0 is deasserted (indicating that the first instruction is a one ROP instruction). II1 706 is routed to R2 if ROP0_0 is asserted and ROP0_1 is deasserted (indicating the first instruction is a two ROP instruction), or if ROP0_0 is deasserted and ROP1_0 is asserted (indicating that the first instruction is a one ROP instruction and the second instruction is a two or three ROP instruction. II2 708 is routed to R2 if ROP0_0 and ROP1_0 are both deasserted (indicating that the first and second instructions are one ROP instructions). In a similar manner, II1 706 and II2 708 are routed to R3–R5.

Figure 8:
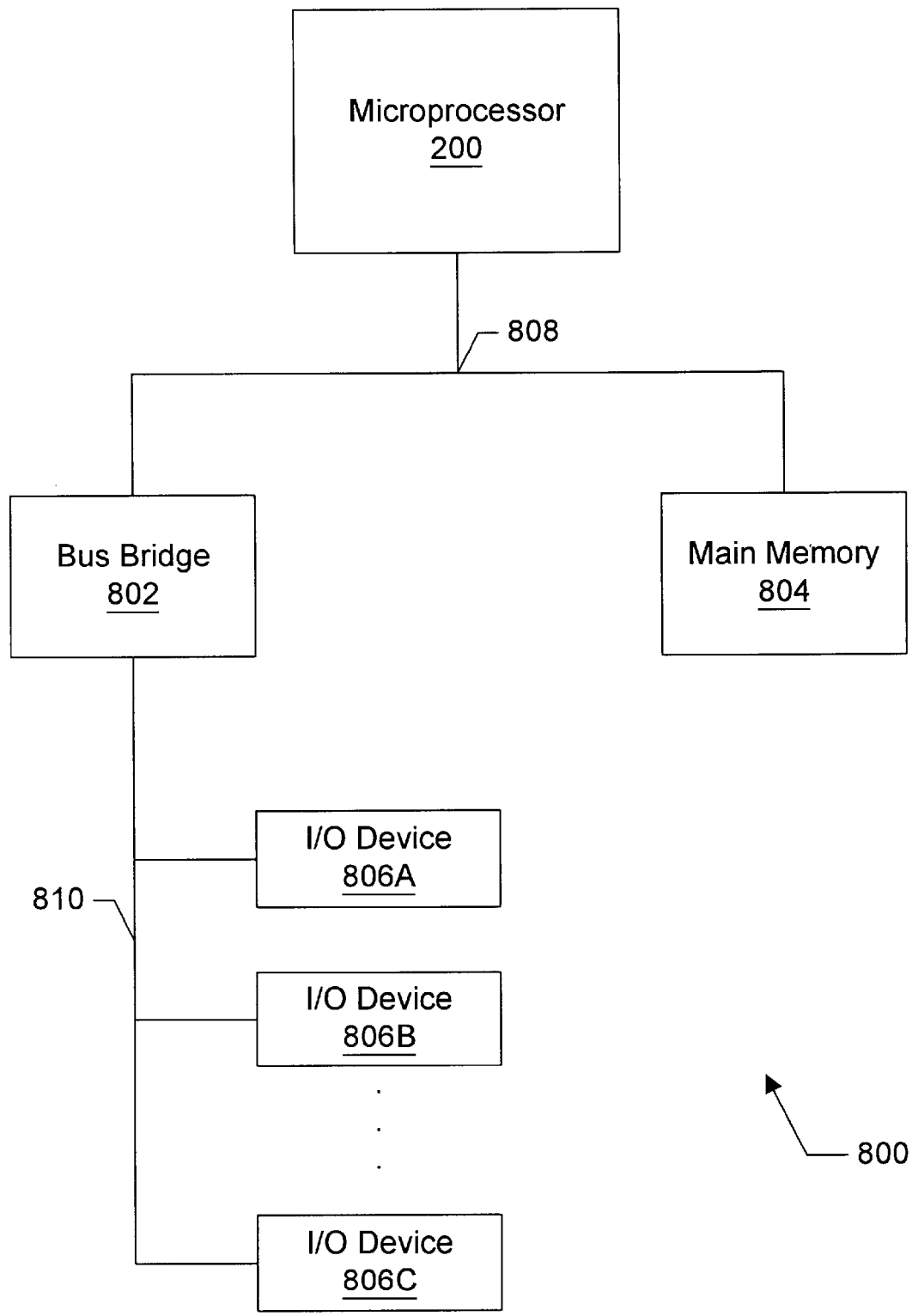
FIG. 8 is a block diagram of a computer system including a superscalar microprocessor that scans for ROPs.

Turning now to FIG. 8, a computer system 800 including microprocessor 200 is shown. Computer system 800 further includes a bus bridge 802, a main memory 804, and a plurality of input/output (I/O) devices 806A–806C. Plurality of I/O devices 806A–806C will be collectively referred to as I/O devices 806. Microprocessor 200, bus bridge 802, and main memory 804 are coupled to a system bus 808. I/O devices 806 are coupled to an I/O bus 810 for communication with bus bridge 802.

Bus bridge 802 is provided to assist in communications between I/O devices 806 and devices coupled to system bus 808. I/O devices 806 typically require longer bus clock cycles than microprocessor 200 and other devices coupled to system bus 808. Therefore, bus bridge 802 provides a buffer between system bus 808 and input/output bus 810. Additionally, bus bridge 802 translates transactions from one bus protocol to another. In one embodiment, input/output bus 810 is an Enhanced Industry Standard Architecture (EISA) bus and bus bridge 802 translates from the system bus protocol to the EISA bus protocol. In another embodiment, input/output bus 810 is a Peripheral Component Interconnect (PCI) bus and bus bridge 802 translates from the system bus protocol to the PCI bus protocol. It is noted that many variations of system bus protocols exist. Microprocessor 200 may employ any suitable system bus protocol.

I/O devices 806 provide an interface between computer system 800 and other devices external to the computer system. Exemplary I/O devices include a modem, a serial or parallel port, a sound card, etc. I/O devices 806 may also be referred to as peripheral devices. Main memory 804 stores data and instructions for use by microprocessor 200. In one embodiment, main memory 804 includes at least one Dynamic Random Access Memory (DRAM) and a DRAM memory controller.

It is noted that although computer system 800 as shown in FIG. 8 includes one bus bridge 802, other embodiments of computer system 800 may include multiple bus bridges 802 for translating to multiple dissimilar or similar I/O bus protocols. Still further, a cache memory for enhancing the performance of computer system 800 by storing instructions and data referenced by microprocessor 200 in a faster memory storage may be included. The cache memory may be inserted between microprocessor 200 and system bus 808, or may reside on system bus 808 in a "lookaside" configuration.

In one embodiment, all the ROPs required to implement an instruction are conveyed to the byte queue together. In an alternative embodiment, each ROP is treated independently. Therefore, one ROP may be conveyed to the byte queue during one scan cycle and the remaining ROPs may be conveyed in the subsequent cycle. If only one of several ROPs of an instruction is conveyed to the byte queue, the ROP bit(s) of the predecode tag are modified to reflect the number of remaining ROPs. In addition, a pointer will be set indicating the number of ROPs instructions conveyed. For example, if only the first ROP of a three ROP instruction is conveyed to the byte queue, the ROP bits of the predecode tag are modified to indicate the instruction is a two ROP instruction and a pointer is set indicating that one ROP has been conveyed. In this manner, during the next scan, only the second and third ROPs of the instruction will be conveyed.

It is further noted that, although the x86 microprocessor architecture and instruction set is shown herein by way of example, the apparatus described may be employed by any microprocessor employing a variable byte length instruction set.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein be reference in its entirety.

It is further noted that aspects regarding byte queue circuitry may be found in the co-pending, commonly assigned patent application entitled "A Byte Queue Divided into Multiple Subqueues for Optimizing Instruction Selection Logic", Ser. No. 08/650,940 filed May 17, 1996 by Narayan, et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,4843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A method for predecoding a variable byte length instruction within a superscalar microprocessor comprising the steps of:

generating an end bit indicative of whether a byte of said instruction is an end byte; and generating an ROP bit that conveys a meaning dependent upon a value of said end bit.

2. The method for predecoding a variable byte length instruction within a superscalar microprocessor as recited in claim 1 wherein said meaning of said ROP bit is further dependent upon a value of an ROP bit of a previous instruction byte.

3. The method for predecoding a variable byte length instruction within a superscalar microprocessor as recited in claim 2 wherein said ROP bit is indicative of a number of microinstructions required to implement said instruction.

4. The method for predecoding a variable byte length instruction within a superscalar microprocessor as recited in claim 3 comprising the further step of providing said end bit and said ROP bits to an instruction alignment unit.

5. The method for predecoding a variable byte length instruction within a superscalar microprocessor as recited in claim 4 comprising the further step of storing data in said instruction alignment unit identifying a microinstruction of said instruction.

6. The method for predecoding a variable byte length instruction within a superscalar microprocessor as recited in claim 5 comprising the further step of decoding and issuing for execution one microinstruction of said instruction based on said data identifying a microinstruction of said instruction.

7. A superscalar microprocessor comprising:
   an instruction cache for storing a plurality of variable byte-length instructions;
   a predecode unit coupled to said instruction cache and configured to generate a predecode tag associated with a byte of an instruction, wherein said predecode tag includes an end bit having a value indicative of whether said byte is a ending byte of said instruction and further includes an ROP bit that conveys a meaning dependent upon said value of said end bit;
   a plurality of decode units for decoding designated instructions which correspond to said plurality of variable byte-length instructions; and
   an instruction alignment unit coupled between said instruction cache and said plurality of decode units for storing said instruction and data identifying microinstructions of said instruction based on said end bit and said ROP bit.

8. The superscalar microprocessor as recited in claim 7 wherein said instruction alignment unit scans said plurality of instructions to identify said instruction.

9. The superscalar microprocessor as recited in claim 8 wherein said data stored by said instruction alignment unit includes a tag identifying one microinstruction of a plurality of microinstructions that implement said instruction.

10. The superscalar microprocessor as recited in claim 9 wherein one of said decode units receives said tag and said instruction, and decodes one microinstruction of said instruction based on a value of said tag.

11. The superscalar microprocessor as recited in claim 10 wherein said plurality of variable byte-length instructions are organized in lines within said instruction cache, wherein a line includes a predetermined number of bytes.

12. The superscalar microprocessor as recited in claim 11 further comprising a plurality of functional units configured to receive output signals from said plurality of decode units.

13. A computer system comprising:
   a main memory;
   a system bus coupled to said main memory;
   a bus bridge coupled to said system bus that interfaces between said system bus and an I/O bus;
   an I/O device coupled to said I/O bus; and
   a superscalar microprocessor coupled to said system bus, wherein said microprocessor includes:
      an instruction cache for storing a plurality of variable byte-length instructions;
      a predecode unit coupled to said instruction cache and configured to generate a predecode tag associated with a byte of an instruction, wherein said predecode tag includes an end bit having a value indicative of whether said byte is a ending byte of said instruction and further includes an ROP bit that conveys a meaning dependent upon said value of said end bit;
      a plurality of decode units for decoding designated instructions which correspond to said plurality of variable byte-length instructions; and
      an instruction alignment unit coupled between said instruction cache and said plurality of decode units for storing said instruction and data identifying microinstructions of said instruction.

14. The superscalar microprocessor as recited in claim 13 wherein said instruction alignment unit scans said plurality of instructions to identify said instruction.

15. The superscalar microprocessor as recited in claim 14 wherein said data stored by said instruction alignment unit includes a tag identifying one microinstruction of a plurality of microinstructions that implement said instruction.

16. The superscalar microprocessor as recited in claim 15 wherein one of said decode units receives said tag and said instruction, and decodes one microinstruction of said instruction based on a value of said tag.

17. The superscalar microprocessor as recited in claim 16 wherein said plurality of variable byte-length instructions are organized in lines within said instruction cache, wherein a line includes a predetermined number of bytes.

18. The superscalar microprocessor as recited in claim 17 further comprising a plurality of functional units configured to receive output signals from said plurality of decode units.

* * * * *